United States Patent
Agarwal

(10) Patent No.: US 9,619,391 B2
(45) Date of Patent: Apr. 11, 2017

(54) IN-MEMORY CACHING WITH ON-DEMAND MIGRATION

(71) Applicant: International Business Machines Corporation, Armonk, NY (US)

(72) Inventor: Kanak B. Agarwal, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/724,068

(22) Filed: May 28, 2015

(65) Prior Publication Data
US 2016/0350226 A1 Dec. 1, 2016

(51) Int. Cl.
G06F 12/00 (2006.01)
G06F 12/0864 (2016.01)
H04L 29/06 (2006.01)
G06F 3/06 (2006.01)

(52) U.S. Cl.
CPC .......... *G06F 12/0864* (2013.01); *G06F 3/067* (2013.01); *G06F 3/0611* (2013.01); *G06F 3/0629* (2013.01); *G06F 3/0647* (2013.01); *H04L 67/42* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 6,973,536 B1 | 12/2005 | Jacobs et al. | |
| 8,732,386 B2 | 5/2014 | O'Krafka et al. | |
| 2010/0174863 A1 | 7/2010 | Cooper et al. | |
| 2012/0173541 A1* | 7/2012 | Venkataramani | G06F 17/3048 707/747 |
| 2013/0198454 A1 | 8/2013 | Sparenberg et al. | |

(Continued)

FOREIGN PATENT DOCUMENTS

CN 102244685 B 9/2013

OTHER PUBLICATIONS

Bhaduaria, Pawan, "Distributed Systems Part 1: A peek into consisten hashing!" Feb. 7, 2014. Retrieved from https://loveforprogramming.quora.com/Distributed-Systems-Part-1-A-peek-into-consistent-hashing.*

(Continued)

*Primary Examiner* — Daniel Tsui
(74) *Attorney, Agent, or Firm* — Garg Law Firm, PLLC; Rakesh Garg; William J. Stock

(57) ABSTRACT

For on-demand migration of data in a distributed memory storage configuration, an identifier is transformed at a client into a transformed identifier. From a current configuration of a first plurality of servers operating on a server-side at a current time, a current server is identified at the client. From a previous configuration of a second plurality of servers operating on a server-side at a previous time, a previous server is identified at the client. A first request is sent to the current server to perform an operation using the identifier. A second request is sent to the previous server to perform the operation using the identifier. When a first data in response to the first request is invalid and a second data in response to the second request is valid, the second data is migrated to the current server in a migration request from the client to the current server.

20 Claims, 9 Drawing Sheets

(56) References Cited

U.S. PATENT DOCUMENTS

2014/0181239 A1 6/2014 Gaonkar et al.
2014/0258595 A1 9/2014 Venkatesha et al.
2016/0088072 A1* 3/2016 Likhtarov ........... H04L 67/1008
709/226

OTHER PUBLICATIONS

Couchbase, "Dealing with Memcached Challenges" 2012. Retrieved from http://info.couchbase.com/rs/northscale/images/Couchbase_WP_Dealing_with_Memcached_Challenges.pdf.*
Disclosed anonymously. (Dec. 2013). A Method to improve virtual machine run-time performance in cloud via dynamic CPU process extend. IPCOM000233552D.
Chiu, D., Shetty, A. & Agrawal, G. (Nov. 2010). Elastic cloud caches for accelerating service-oriented computations. 2010 International Conference for High Performance Computing, Networking, Storage and Analysis (SC), 1-11. IEEE.
Amazon; Amazon ElastiCache, 2015.
Nishtala et al; Scaling Memcache at Facebook, NSDI 2013, 10th USENIX Symposium on Networked Systems Design and Implementation, 385-398.
Das et al; Albatross: Lightweight Elasticity in Shared Storage Databases for the Cloud using Live Data Migration, VLDB 2011, Proceedings of the VLDB Endowment, vol. 4, No. 8.
Elmore et al; Zephyr: Live Migration in Shared Nothing Databases for Elastic Cloud Platforms, SIGMOD 2011, SIGMOD'11, Jun. 12-16, 2011, Athens, Greece.
Rhea et al; Handling Churn in a DHT, Usenix ATC 2004.

* cited by examiner

IN-MEMORY CACHING WITH ON-DEMAND MIGRATION

TECHNICAL FIELD

The present invention relates generally to a method, system, and computer program product for improving cached data response performance in client-server architecture. More particularly, the present invention relates to a method, system, and computer program product for in-memory caching with on-demand migration.

BACKGROUND

Some data is needed repeatedly or frequently in a data processing system. A read or write operation with the data is significantly faster in a volatile memory device such as DRAM as compared to in a permanent storage device such as a hard drive.

Caching is the process of holding such data in a region of a memory device in the data processing system, as opposed to serving the data from a permanent storage device. Such a region of the memory device is called a cache memory, or simply, a cache. In a non-distributed caching environment, each computing node configures its own local cache and access to a cache is restricted to the computing node in which the corresponding region of the memory device is configured.

For example, often, several servers collaborate to service client requests in a data processing environment. For example, many application servers collaboratively service requests to perform operations on a back-end database. In such a configuration, numerous clients make database requests, and one of the collaborating application servers receives a particular request from a client. That application server attempts to service the database request using data in that application server's cache, if the required data is available in the application server's cache. When the data needed to service the request is present in that application server's cache, the application server is able to service the request much faster than when the data needed to service the request is not in that application server's cache. When the data needed to service the request is not in that application server's cache, the application server accesses the database for the needed data and services the request at a significantly slower speed.

Memcache is a distributed cache management mechanism whereby the amount of cache memory available to a collaborating server is increased by pooling memory from other collaborating servers. For example, if two application servers are collaborating in a memcache configuration, each server sets aside some or all of its memory for sharing with the other server. The shared memory is accessible to the collaborating servers as a cache pool called memcache. Thus, each collaborating server has access to a combined cache size that is much larger than the cache available in that server alone.

Each data object in the memcache has a key associated therewith. The collection of the keys forms a key-space. Each key can be hashed according to a hashing algorithm and the collection of all possible hash values according to the algorithm forms a hash space, whether or not an actual key hashes to a possible hash value in the hash space.

Memcache uses a consistent hashing scheme to distribute key-value records across multiple memcache servers. The consistent hashing scheme treats the hash space as a fixed circular ring. Each server node is assigned one or more random values on the ring. A server node is responsible for all keys in the hash-space that correspond to its position in the ring and its predecessor's (or successor depending on the implementation) position in the ring. The memcache clients use the hash of the key to identify the target server and route a request to the appropriate server node directly. Each server is responsible for its own cache that is participating in the memcache and is completely independent of other servers with no shared state and synchronization between servers. In other words, each server has visibility into a portion, or segment, of the memcache that spans the server's own cache. When a request for an object comes to a server, if the requested object exists in the server's own cache segment, the server responds with the data of the object from the server's own cache. Otherwise, the server has a cache miss.

For this operation, a request has to be specifically directed to a specific target memcache server in the hash ring. A client-side library handles the sending of a client's request to a designated target server in a hash ring. Depending upon the hash value of the key of the requested object, the library selects one of the memcache servers in a given hash ring as a target server, and sends the request with the key to that target server. If the requested object exists in the segment of memcache associated with that target server, the target server responds with the data of the requested object from that segment of the cache. Otherwise, the target server has a cache miss. The client receives the cache miss information and accesses the data from another storage location outside the memcache.

SUMMARY

The illustrative embodiments provide a method, system, and computer program product for in-memory caching with on-demand migration. An embodiment includes a method for on-demand migration of data in a distributed memory storage configuration. The embodiment transforms, at a client-side data processing system, using a processor, an first identifier to form a transformed identifier. The embodiment identifies, at the client-side data processing system, from a current configuration of a first plurality of servers operating on a server-side at a current time, a current server. The embodiment identifies, at the client-side data processing system, from a previous configuration of a second plurality of servers operating on a server-side at a previous time, a previous server. The embodiment sends, a first request to the current server to perform an operation using the first identifier. The embodiment sends, a second request to the previous server to perform the operation using the first identifier. The embodiment migrates, responsive to a first data in response to the first request being invalid and responsive to a second data in response to the second request being valid, the second data in a migration request from the client side data processing system to the current server.

Another embodiment includes a computer usable program product comprising a computer readable storage device including computer usable code for on-demand migration of data in a distributed memory storage configuration.

Another embodiment includes a data processing system for on-demand migration of data in a distributed memory storage configuration.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
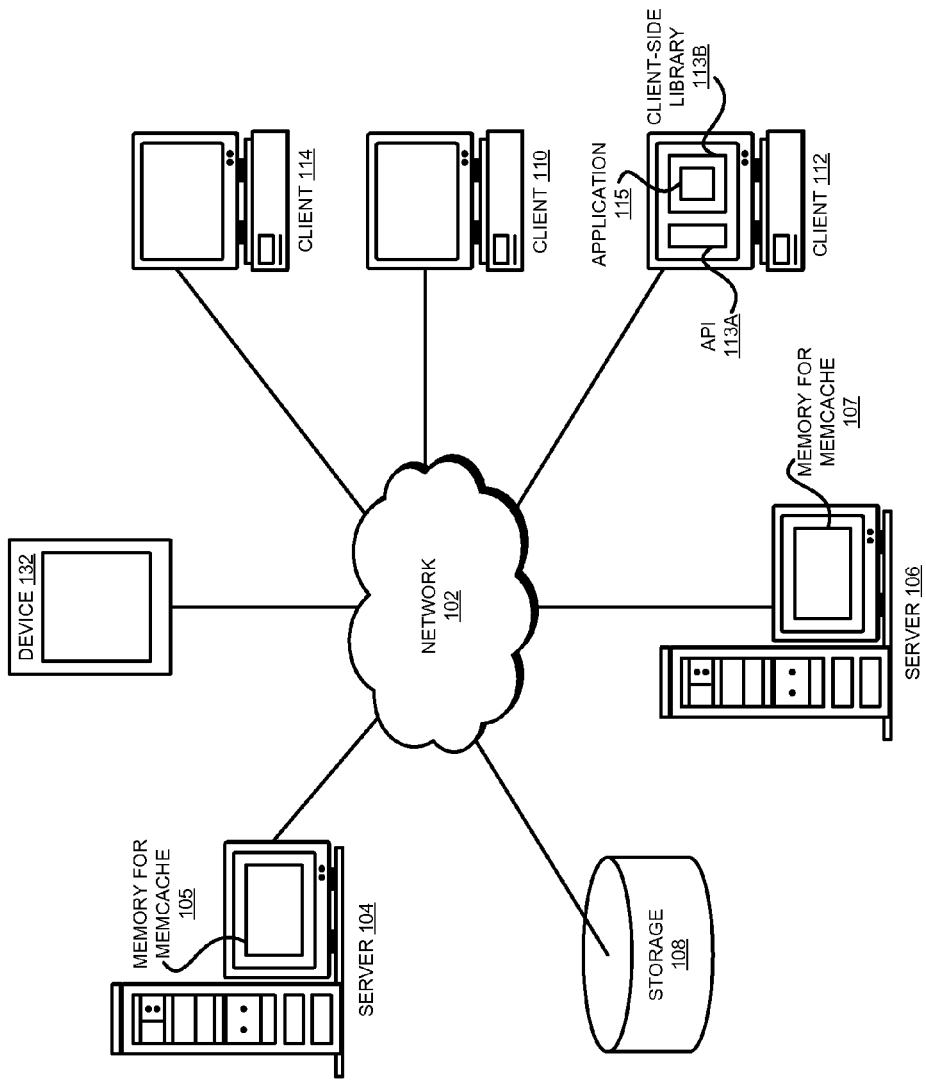
FIG. 1 depicts a block diagram of a network of data processing systems in which illustrative embodiments may be implemented.

The illustrative embodiments are described using hashing, such as by using a hashing algorithm, hash value, hash value range, hash space, and a ring based on hashing, only as a non-limiting example. From this disclosure, those of ordinary skill in the art will be able to conceive many other transformations other than hashing, and their use in a manner similar to a hashing based use described herein, and the same are contemplated within the scope of the illustrative embodiments.

The illustrative embodiments recognize that the number of servers collaborating to service client requests at any given time is variable according to capacity demand, performance requirements, and other factors. Therefore, servers are routinely added or removed from collaborative configurations servicing client requests.

The illustrative embodiments recognize that dynamically adding and removing servers from a cluster using consistent hashing is particularly problematic. Consistent hashing is a process of distributing objects based on their keys amongst servers. For this distribution, consistent hashing scheme uses a circular hash ring based on the output range of the hash function. For example, if an example hash function generates N-bit hash values, the hash space includes $2^N$ possible hash values. If four memcache servers were operating in an example hash ring, server 1 could be responsible for hash values 0-n1 and their corresponding objects in a segment of memcache. Similarly, server 2 could be responsible for hash values (n1+1)-n2, server 3 could be responsible for hash values (n2+1)-n3, and server 4 could be responsible for hash values (n3+1)-($2^N$–1). Equal distribution of the hash space amongst the collaborating memcache servers is not required. In practice, servers are assigned on or more random positions in the ring, and a server is responsible for the key space that hashes to its position in the ring and its predecessor's position in the ring.

Normally, if consistent hashing is not used, insertion of a new server may cause the redistribution of the entire hash space, amongst the new enlarged group of servers, each server servicing a revised hash value range. Consistent hashing avoids the redistribution of the entire hash space and simply redistributes only that hash value range in which the new server is inserted.

For example, a fifth server is inserted between servers 2 and 3 in the hash ring, i.e., to the left of server 3. Thus, only server 3's hash value range (n2+1)-n3 is redistributed between servers 5 and 3, the hash value ranges of the other servers in the hash ring remaining unchanged. For example, server 5 now serves requests corresponding to hash values (n2+1)-nx, and server 3 now serves requests corresponding to hash values (nx+1)-n3.

Now suppose that an additional server is needed at some point in time to handle the client request traffic and server 5 is inserted in the hash ring between servers 2 and 3 in the above-described example manner. At the time of insertion, server 5 has a cache that does not yet have any objects in it. In other words, server 5 has an empty cache.

Upon server 5's insertion into the hash ring, client requests with hash values in the hash value range serviced by server 5 begin to arrive at server 5. The illustrative embodiments recognize that it can cause many cache misses for these requests because the requested data is not yet in server 5's cache. These cache misses will occur even though the requested data exists in memcache at server 3.

The illustrative embodiments recognize that presently, in order to avoid cold cache at server 5, server 3 (or server 2, depending upon the implementation) could begin populating server 5's cache with objects corresponding to the hash value range in the hash space that server 5 would service. While server 3 populates server 5's cold cache, server 5 can still experience many cache misses for these requests because the requested data is not yet in server 5's cache.

The illustrative embodiments further recognize that server 3 has to indiscriminately populate—or warm up—server 5's cold cache with all the objects that correspond to the hash value range that server 5 now serves, whether or not those objects are being requested from server 5 by the clients. The illustrative embodiments also recognize that such prior-art warming up process is computationally expensive. Such warming up also wastefully consumes computing resources at an existing memcache server, e.g., server 3, and at the new server, e.g., server 5.

The illustrative embodiments further recognize that such warm up can populate an object in the new server's cache and that object may not get read or may get refreshed. Therefore, the resources expended in the prior-art warming up of the new server cache are also wasted. Furthermore, the server side migration requires servers to be aware of other servers and know the hashing algorithm rather than being fully independent and unaware of other servers. Therefore, the prior-art method of operating a hash ring of memcache servers is deficient and has to be changed.

The illustrative embodiments used to describe the invention generally address and solve the above-described problems and other problems related to operating a memcache configuration. The illustrative embodiments provide a method, system, and computer program product for in-memory caching with on-demand migration.

An embodiment can be implemented on the client-side of a client-server data processing environment, where the server-side uses a consistent hashing configuration to directly service a client request from the target server node. For example, an embodiment can be implemented as an application, a new function or component, or a modification of an existing function or component in a client-side library.

A requestor application executing on the client uses a client Application Program Interface (API) to send a request to the server-side for the data of an object. The request includes a key value, which is an identifier of a suitable type and form, corresponding to the object being requested.

The client API uses an embodiment in the client-side library to hash the key to a hash value. The embodiment uses the hash value to identify, from a known hash ring, a particular target server in the hash ring.

More specifically, the embodiment identifies two target servers as follows—the embodiment maintains a sliding-window history of the changing states of a hash ring. For example, the state of a hash ring changes when a server is added or removed from the hash ring. The embodiment stores a previous state of the hash ring (previous hash ring) and a current state of the hash ring (current hash ring) at any given time. A previous hash ring is kept only for the configured time window, after which the previous hash ring expires. The current hash ring is always the latest hash ring.

The embodiment identifies one target server in the current hash ring that would receive the request according to the hash value. This target server is referred to herein as the primary server or the current server. The embodiment identifies another target server in the previous hash ring that would have received the request according to the hash value. This target server is referred to herein as the secondary server or the previous server.

Note that the current hash ring and the previous hash ring can be different in that they may include different servers for different hash value ranges. Accordingly, the current server and the previous server may turn out to be different servers for a given hash value.

When a client needs to read object data for a key from the system, the embodiment sends the read or "get" request with the key for the object to the current server as well as to the previous server. The embodiment receives responses containing the requested object data from both servers—the current server as well as the previous server.

The embodiment checks the validity of the data received from the current server. If the data from the current server is valid, the embodiment provides the data from the current server to the requestor application on the client as a response to the request.

If the data from the current server is invalid, the embodiment checks the validity of the data received from the previous server. If the data from the previous server is valid, the embodiment provides the data from the previous server to the requestor application on the client as a response to the request.

Furthermore, an embodiment initiates a migration of the valid data from the previous server to the current server. For example, one embodiment configures a "set" request with the valid data from the previous server. The embodiment sends the set request and the valid data to the current server in order to cause the current server to "set" or write the valid data corresponding to the key.

Optionally, the valid data can be removed from the previous server as well. For example, another embodiment configures a "delete" request with the key. The embodiment sends the delete request to the previous server to cause the previous server to no longer contain or maintain data corresponding to the key in its cache.

Similarly, when a client needs to write object data to the system, an embodiment sends the write (or "put") request to the current server. If the previous server is different from the current server, an embodiment also optionally sends a delete request to the previous server to cleanup any old residual object data from the previous server.

Similarly, when a client needs to delete object data from a server, an embodiment sends the invalidate (or "delete") request to the current server. If the previous server is different from the current server, an embodiment also optionally sends a delete request to the previous server to cleanup any old residual object data from the previous server.

Note that an embodiment does not require the client API to change. A requestor application need not be modified to use an embodiment because the API remains unchanged.

An embodiment also does not require the memcache implementation on the server-side to change. Also, the prior-art servers-side warm-up of cold or empty caches is no longer needed. A cold cache is populated as and when objects are requested from the new server, and the migration occurs when the requested data is unavailable in the new server while valid data is available in an alternate server previously responsible for holding that data.

A method of an embodiment described herein, when implemented to execute on a device or data processing system, comprises substantial advancement of the functionality of that device or data processing system in servicing data requests by using cached data. For example, prior-art either suffers from cold cache problem or requires cost-intensive and wasteful warm up of cold caches when new servers are added to a hash ring. An embodiment causes the cold cache to receive valid data when the data in the cache is actually invalid or unavailable and upon demand. An embodiment further cleans up residual data from the cache of a previous server that previously serviced a hash value where that hash value is now serviced by a new server. Operating in a manner described herein, an embodiment performs in-memory caching with on-demand migration. Such manner of operating a memcache configuration is unavailable in presently available devices or data processing systems. Thus, a substantial advancement of such devices or data processing systems by executing a method of an embodiment saves considerable computing resources in maintaining valid data in the correct cache in a memcache configuration.

The illustrative embodiments are described with respect to certain applications, API, library, requests or library calls, keys, hashing based transformations and operations, timings and time windows, memory operations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
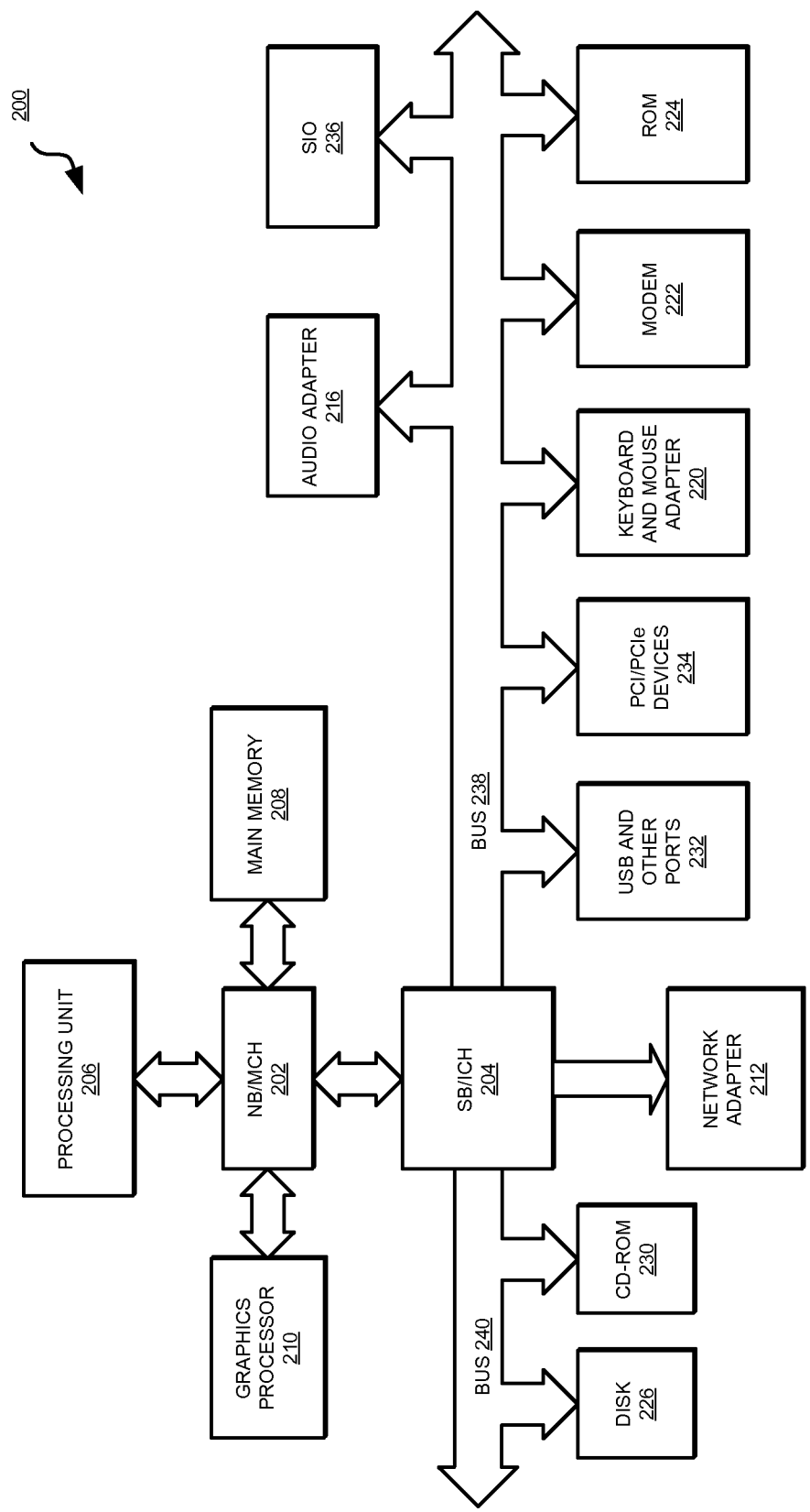
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

An embodiment described herein can be implemented in any data processing system, such as in the form of application 115 in client 112. Memcache 105 in server 104 is the cache that server 104 contributes to memcache when server 104 is a memcache server. Memcache 107 in server 106 is the cache that server 106 contributes to memcache when server 106 is a memcache server. A requestor application (not shown) executing in client 112 uses API 113A to access library 113B. Application 115 can be implemented within library 113B as shown, or outside library 113B but operating in conjunction with library 113B to perform an operation described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
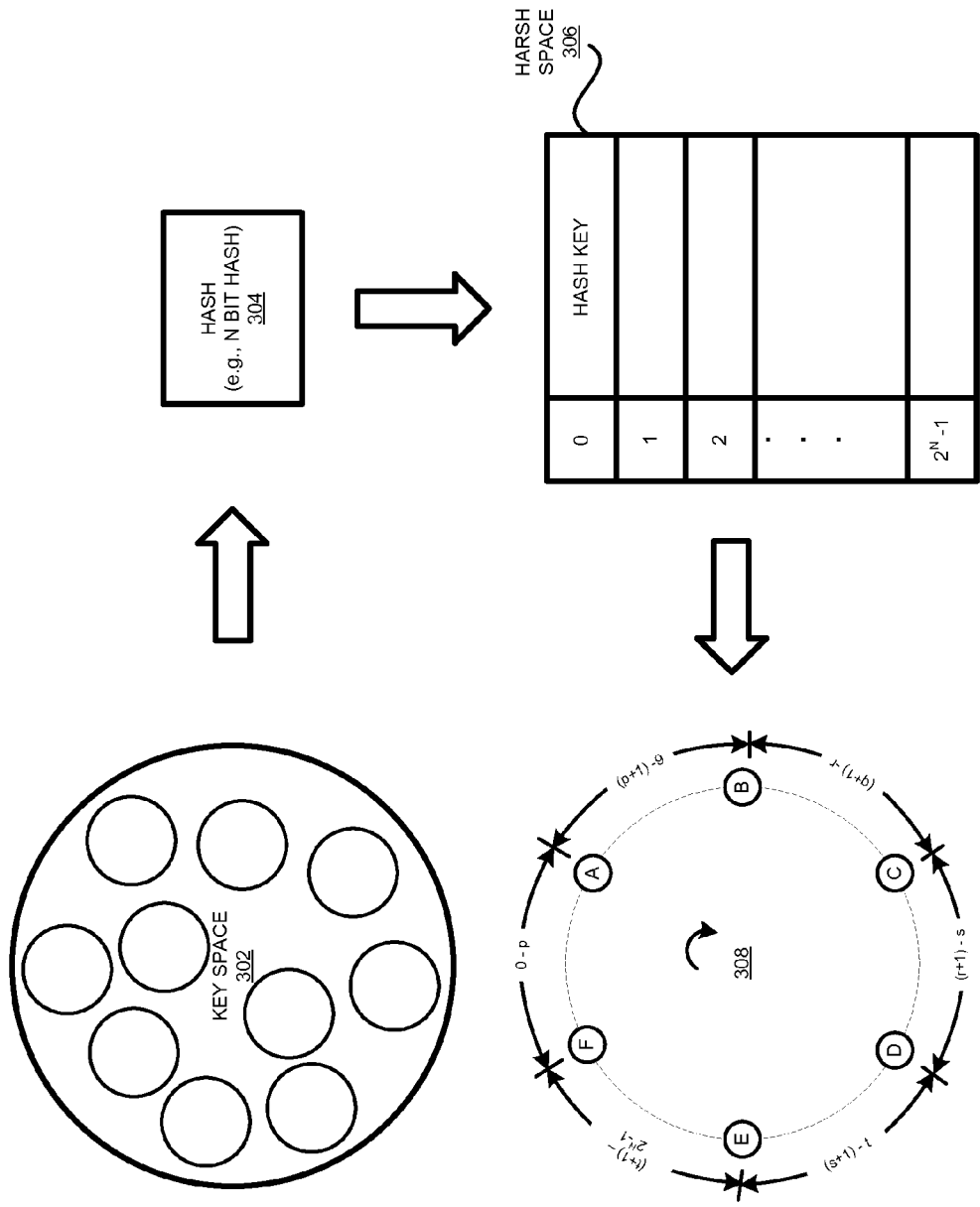
FIG. 3 depicts a memcache configuration in which in-memory caching with on-demand migration can be performed in accordance with an illustrative embodiment.

With reference to FIG. 3, this figure depicts a memcache configuration in which in-memory caching with on-demand migration can be performed in accordance with an illustrative embodiment. Server labeled A (hereinafter, "server A", and other servers named similarly) is an example of server 104 in FIG. 1. Generally, any of server A, server B, server C, server D, server E, and server F can be implemented using server 104 in FIG. 1.

Key space 302 includes a number of keys, each key being an identifier that is uniquely associated with a corresponding data object on the server-side. A client-side requestor application uses a key from key space 302 in a request for the corresponding data object from a memcache server.

Function 304 exists in a client-side library. As a non-limiting example, function 304 is a hashing function, such as a function that hashes a key into an N-bit value. Function 304 receives the key in the request, and transforms the key into a transformed identifier, such as a hash value.

The transformed identifier of the key is a member of a different identifier space 306. For example, if function 304 produces an N-bit hash of a key, the resulting hash value belongs in hash space 306, which would include $2^N$ distinct hash values.

The transformed identifier is used with memcache configuration 308, in which memcache servers A, B, C, D, E, and F participate, to identify the target server. Server A is responsible for servicing requests containing transformed identifiers within a particular range. Similarly memcache servers are responsible for servicing requests containing transformed identifiers within other particular ranges. For example, in case of N-bit hash values divided in any sized hash value ranges, server A serves the request for data objects corresponding to hash values 0 through p. Similarly, server B is responsible for serving objects corresponding to hash value range (p+1) through q; server C is responsible for serving objects corresponding to hash value range (q+1) through r; server D is responsible for serving objects corresponding to hash value range (r+1) through s; server E is responsible for serving objects corresponding to hash value range (s+1) through t; and server F is responsible for serving objects corresponding to hash value range (t+1) through $2^N$-1.

Figure 4:
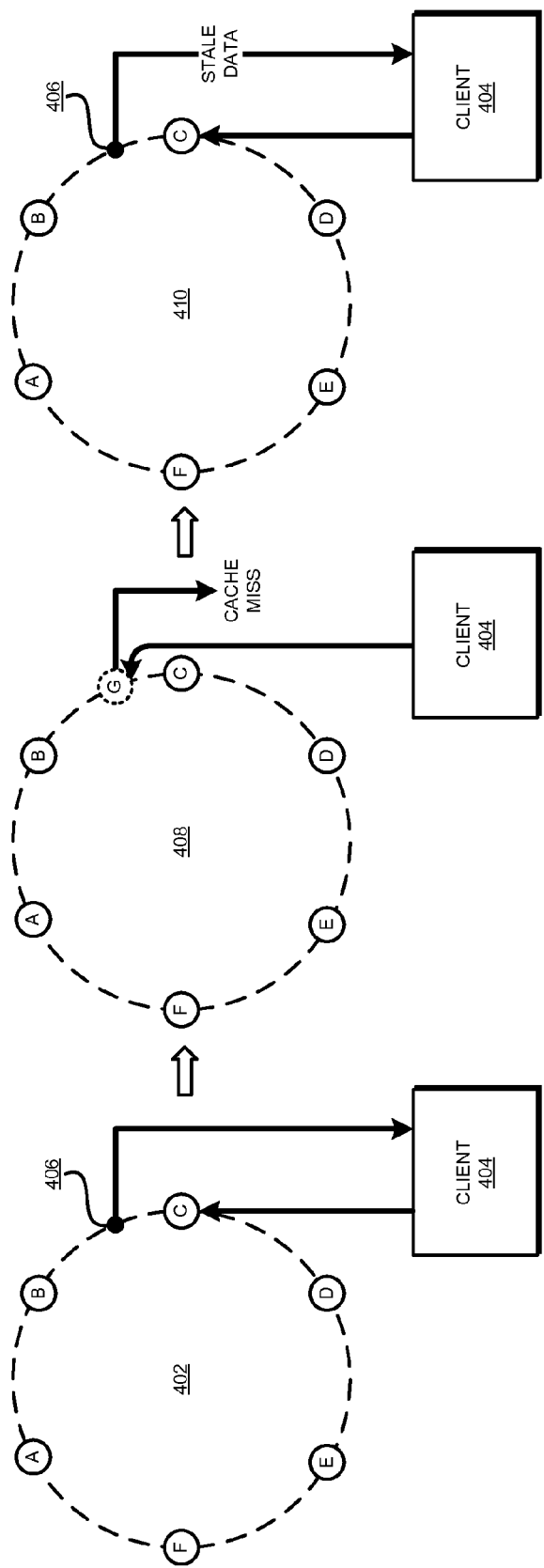
FIG. 4 depicts examples of memcache operations that can be improved in accordance with an illustrative embodiment.

With reference to FIG. 4, this figure depicts examples of memcache operations that can be improved in accordance with an illustrative embodiment. Ring 402 is an example of ring 308 in FIG. 3. Client 404 is an example of client 112 without the benefit of an embodiment.

Client 404 sends a request to server C in ring 402. Server C finds object 406 within the transformed identifier range for which server C is responsible. Server C returns the data of object 406 to client 404.

At some point in time, server G is introduced in the cluster and occupies a position in ring 402, resulting in ring 408. Assume that requests for object 406 will henceforth be serviced by server G in ring 408. Before server G's cache is warmed up, client 404 sends a request for object 406 to server G. Server G does not have object 406 in its cache at the time of the request, resulting in a cache miss at server G.

At some later point in time, server G is removed from ring 408, resulting in ring 410. Server C is again responsible for servicing requests for object 406. Server C, however has the data of object 406 when server C participated in ring 402, some time ago. Client 404 sends a request for object 406 to server C. Server C serves the stale data of object 406 to client 404.

As is evident from FIG. 4, the cache miss resulting from a cold cache problem, and a stale data problem has to be remedied in a ring of memcache servers.

Figure 5:
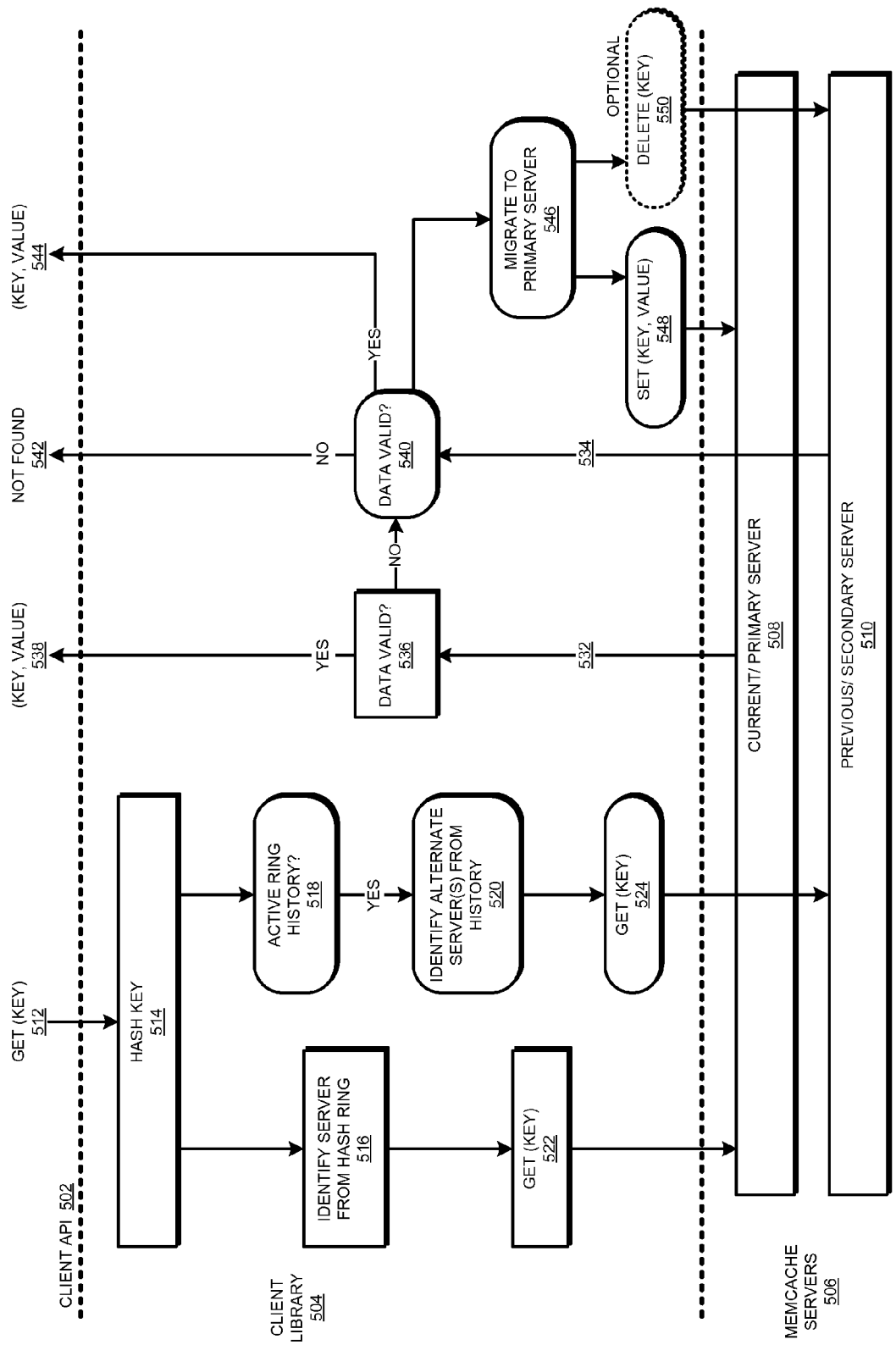
FIG. 5 depicts an example process of in-memory caching with on-demand migration in accordance with an illustrative embodiment.

With reference to FIG. 5, this figure depicts an example process of in-memory caching with on-demand migration in accordance with an illustrative embodiment. Client API 502 is an example of API 113A in FIG. 1. Client library 504 is an example of library 113B in FIG. 1. Memcache servers 506 can be implemented using servers such as server 104 in FIG. 1. Hashing based operations are assumed and depicted in this figure only for the clarity of the description without implying any limitation thereto.

Current or primary server 508 is a server responsible for a hash value in a given hash value range in a current state of a hash ring. Previous or secondary server 510 is a server that was responsible for the same hash value, but in the same or different hash value range, in a previous state of the hash ring.

A requestor application uses API 502 to send request 512. As an example, request 512 calls "get" API with a key. API 502 passes request 512 to library 504, where function 514 hashes the key according to a pre-determined hashing algorithm.

According to an embodiment, function 514 identifies (516) primary server 508 as the current server in the current hash ring, which will service requests with the key. Additionally, if active ring history is present (518), to wit, one or more previous states of the hash ring are being maintained, function 514 also identifies (520) the corresponding one or more secondary servers which would have serviced requests with the hash value in their respective previous hash rings.

Function 514 sends request 522 to primary server 508, such as in the form of a "get" request with the key. Similarly, function 514 sends one or more requests 524 to one or more secondary servers 510, such as in the form of a "get" request with the key.

Primary server 508 sends response 532. Response 532 may contain data of the requested object or an indication that the requested data is unavailable at primary server 508. Similarly, one or more secondary servers 510 sends response 534. Response 534 may contain data of the requested object or an indication that the requested data is unavailable at one or more secondary servers 510.

According to an embodiment, a function in library 504 determines whether the data in response 532 is valid (536). Data is valid if the object corresponding to the data is current and available on the server-side. Data is invalid if the object corresponding to the data is out-of-date or not found on the server-side.

If the data in response 532 is valid, the function sends (538) the data from primary server 508 as a key-value pair (the key and the value returned for the key) to the requestor. If the data in response 532 is invalid, the function determines (540) whether the data in response 534 is valid. If the data in response 534 is invalid, the function informs (542) the requestor that the data was not found for the key in request 512. If the data in response 534 is valid, the function sends (544) the data from secondary server 510 as a key-value pair to the requestor.

Furthermore, according to an embodiment, a function migrates (546) the data from secondary server 510 to primary server 508. For example, the function sends a write request (548), e.g., a "set" request, with the key and the data from secondary server 510 to primary server 508.

Furthermore, according to an embodiment, a function optionally cleans up secondary server 510. For example, the function sends a invalidate request (550), e.g., a "delete" request, with the key to those one or more secondary servers 510 which responded to request 524 with some data.

Figure 6:
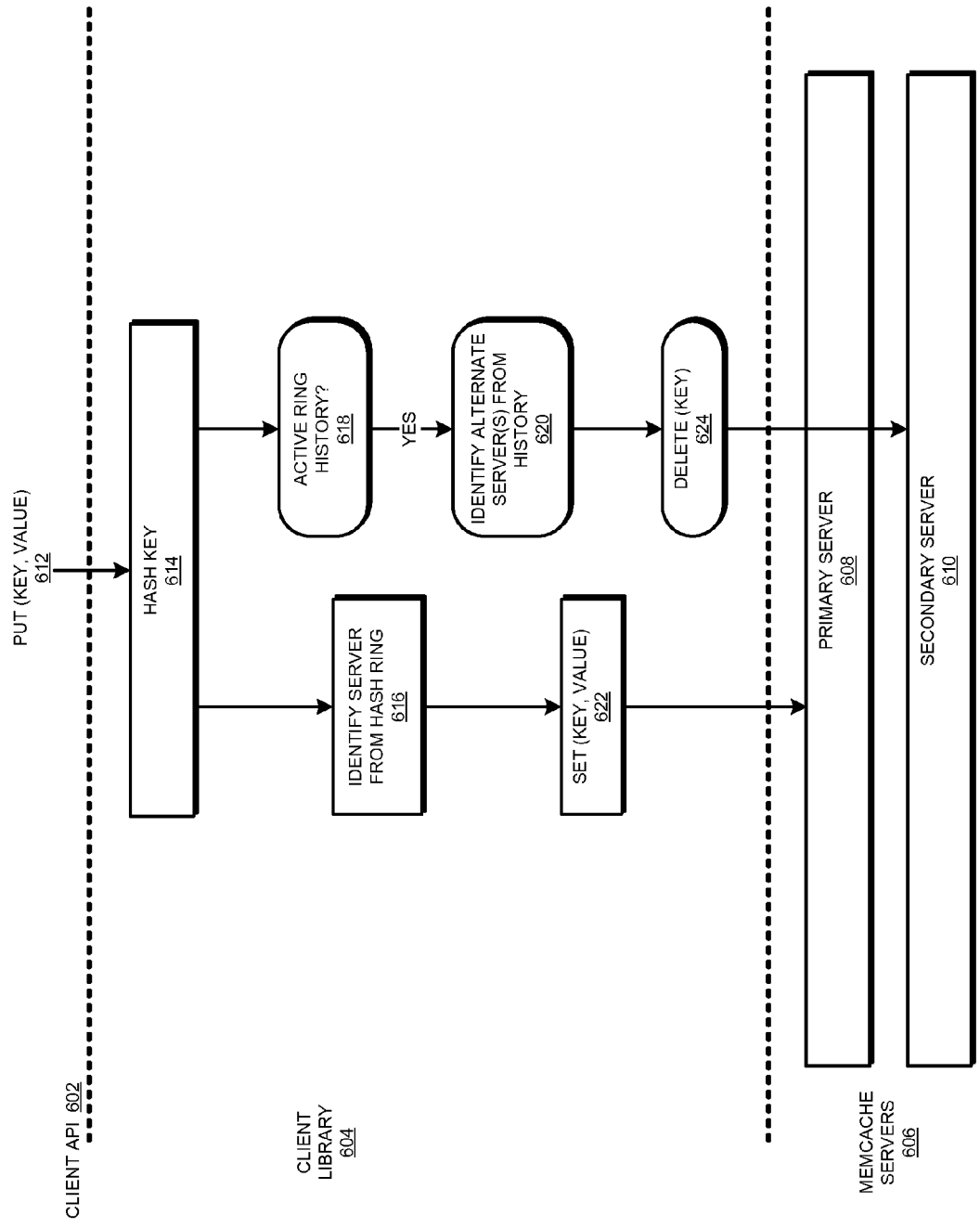
FIG. 6 depicts another example process of in-memory caching with on-demand migration in accordance with an illustrative embodiment.

With reference to FIG. 6, this figure depicts another example process of in-memory caching with on-demand migration in accordance with an illustrative embodiment. Client API 602 is an example of API 502 in FIG. 5. Client library 604 is an example of library 504 in FIG. 5. Memcache servers 606 are examples of memcache servers 506 in FIG. 5. Primary server 608 is similar to primary server 508 in FIG. 5. One or more secondary servers 610 are similar to one or more secondary servers 510 in FIG. 5. Hashing based operations are assumed and depicted in this figure only for the clarity of the description without implying any limitation thereto.

A requestor application uses API 602 to send request 612 to write the data of an object. As an example, request 612 calls "put" API with a key-value pair. API 602 passes request 612 to library 604, where function 614 hashes the key according to a pre-determined hashing algorithm.

According to an embodiment, function 614 identifies (616) primary server 608 as the current server in the current hash ring, which will service requests with the hash value of the key. Additionally, if active ring history is present (618), to wit, one or more previous states of the hash ring are being maintained, function 614 also identifies (620) the corresponding one or more secondary servers which would have serviced requests with the key in their respective previous hash rings.

Function 614 sends request 622 to primary server 608, such as in the form of a "set" request with the key and the data that is to be written corresponding to that hash value on the server-side. Optionally, function 614 sends one or more cleanup requests 624 to one or more secondary servers 610, such as in the form of a "delete" request with the key.

Figure 7:
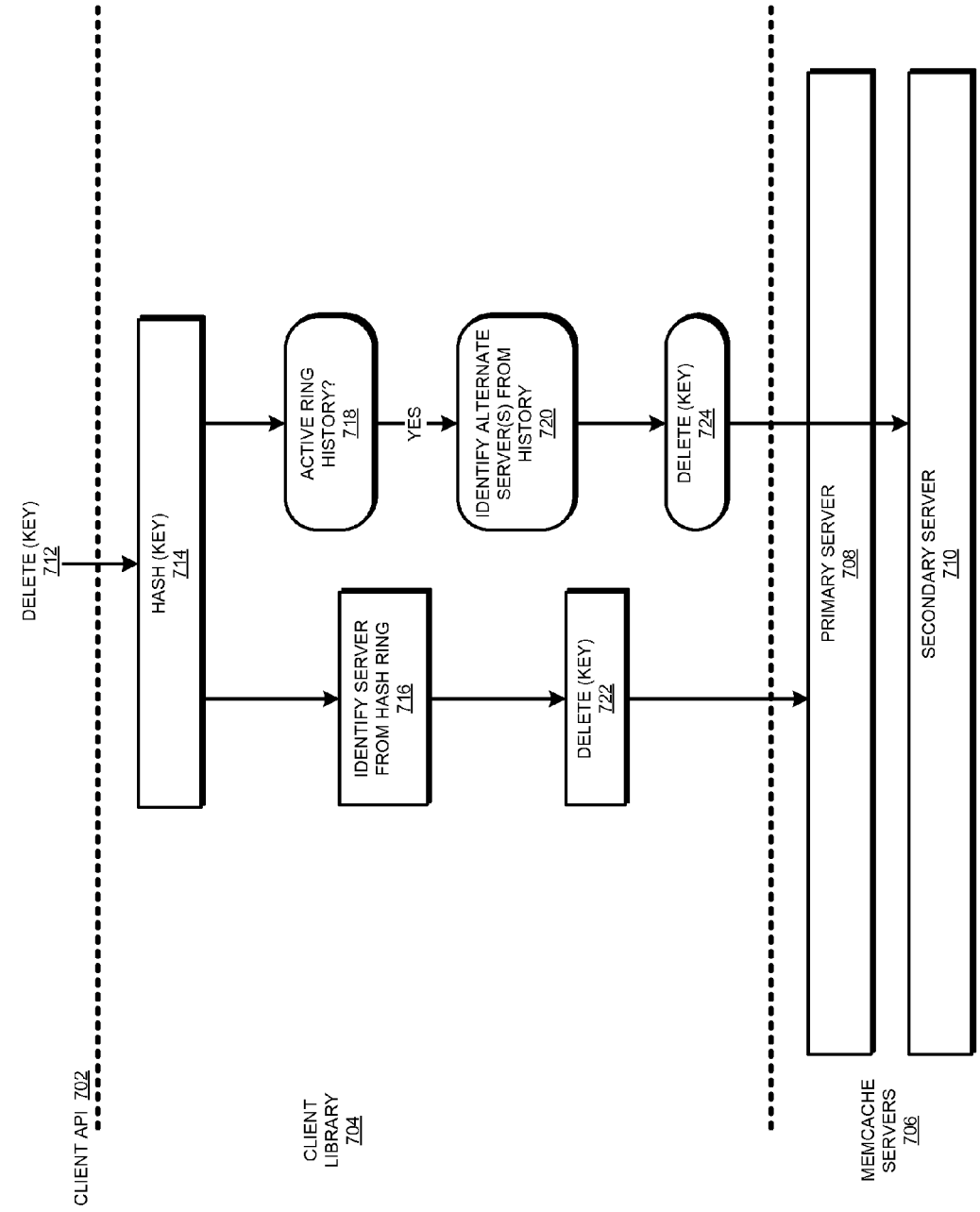
FIG. 7 depicts another example process of in-memory caching with on-demand migration in accordance with an illustrative embodiment.

With reference to FIG. 7, this figure depicts another example process of in-memory caching with on-demand migration in accordance with an illustrative embodiment. Client API 702 is an example of API 602 in FIG. 6. Client library 704 is an example of library 604 in FIG. 6. Memcache servers 706 are examples of memcache servers 606 in FIG. 6. Primary server 708 is similar to primary server 608 in FIG. 6. One or more secondary servers 710 are similar to one or more secondary servers 610 in FIG. 6. Hashing based operations are assumed and depicted in this figure only for the clarity of the description without implying any limitation thereto.

A requestor application uses API 702 to send request 712 to delete or otherwise invalidate the data of an object. As an example, request 712 calls "delete" API with a key whose corresponding object is to be deleted or invalidated on the server-side. API 702 passes request 712 to library 704, where function 714 hashes the key according to a pre-determined hashing algorithm.

According to an embodiment, function 714 identifies (716) primary server 708 as the current server in the current hash ring, which will service requests with the hash value of the key. Additionally, if active ring history is present (718), to wit, one or more previous states of the hash ring are being maintained, function 714 also identifies (720) the corresponding one or more secondary servers which would have serviced requests with the key in their respective previous hash rings.

Function 714 sends request 722 to primary server 708, such as in the form of a "delete" request with the key. Optionally, function 714 sends one or more cleanup requests 724 to one or more secondary servers 610, such as in the form of a "delete" request with the key.

Figure 8:
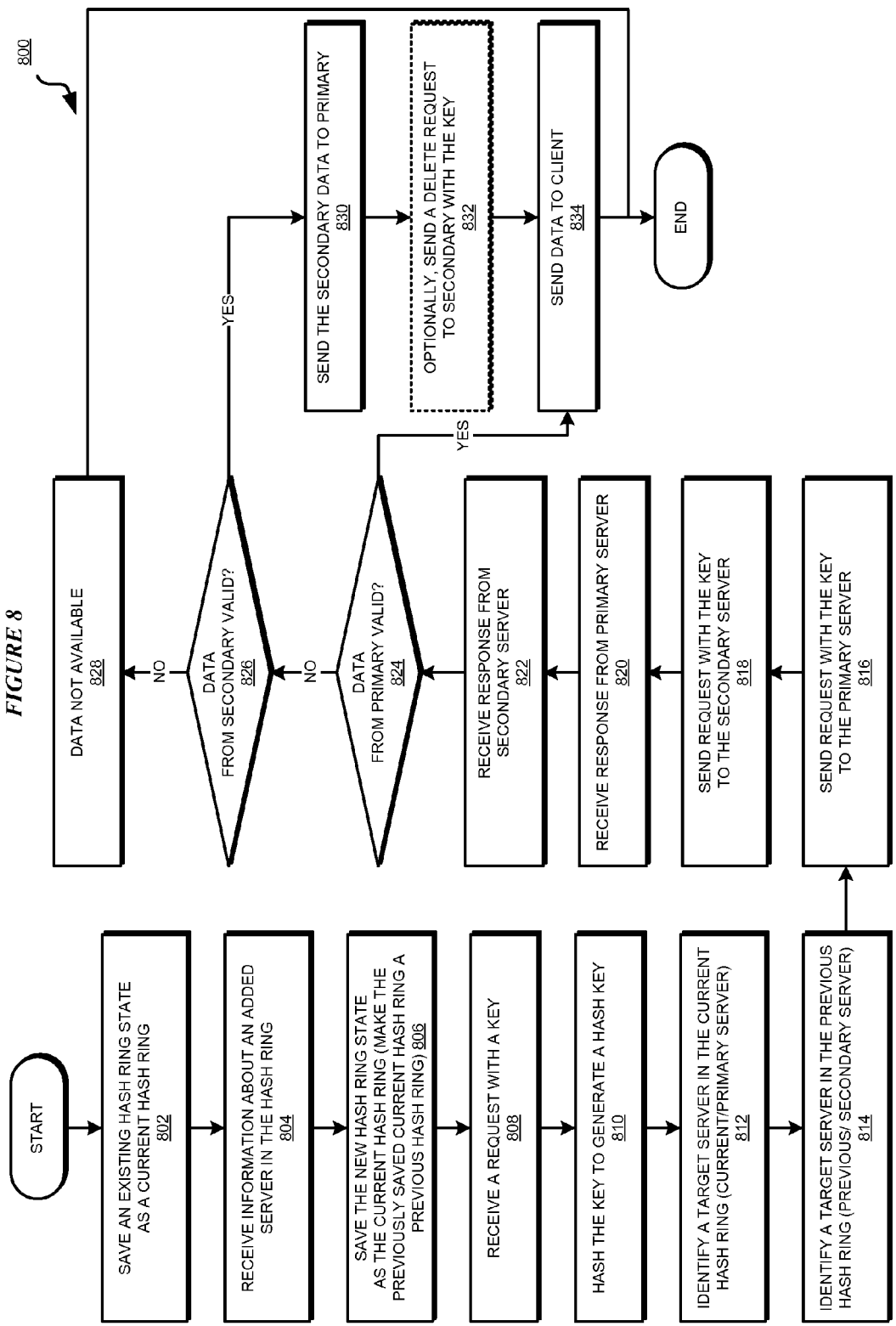
FIG. 8 depicts a flow chart of an example process for in-memory caching with on-demand migration in accordance with an illustrative embodiment.

With reference to FIG. 8, this figure depicts a flow chart of an example process for in-memory caching with on-demand migration in accordance with an illustrative embodiment. Process 800 can be implemented in application 115 in FIG. 1, such as in the form of one or more functions in library 504, 604, and 704 in FIGS. 5, 6, and 7, respectively. Hashing based operations are assumed and depicted in this figure only for the clarity of the description without implying any limitation thereto.

Any number of previous hash rings may be saved at different times. At a first time, an embodiment implemented as a function in a client side library of memcache saves an existing state of a hash ring as a current hash ring (block 802).

Sometime after the first time, the function receives information about a new server that has been added in the hash ring (block 804). At a second time, the function saves the new state of the hash ring—with the new server in the ring—as a current hash ring (block 806). The previously saved current hash ring becomes a previous hash ring.

The function receives a request with a key (block 808). The function transforms, e.g. hashes, the key to generate a transformed identifier, e.g., a hash value or a hash key (block 810).

The function identifies a target server, to wit, a current server, in the current hash ring using the hash key (block 812). The function identifies a target server, to wit, a previous server, in a previous hash ring (block 814).

The function sends the request with the key to the primary server (block 816). The function sends the request with the key to the secondary server (block 818). The function receives a response from the primary server (block 820). The function receives a response from the secondary server (block 822).

The function determines whether the data in the response from the primary server is valid (block 824). If the data in the response from the primary server is valid ("Yes" path of block 824), the function progresses process 800 to block 834. If the data in the response from the primary server is invalid ("No" path of block 824), the function determines whether the data in the response from the secondary server is valid (block 826).

If the data in the response from the secondary server is invalid ("No" path of block 826), the function concludes that the requested data is not available (block 828). The function ends process 800 thereafter.

If the data in the response from the secondary server is valid ("Yes" path of block 826), the function sends the data from the secondary server to the primary server for migration the object data corresponding to the key to the primary server (block 830). Optionally, the function sends a delete request to the secondary server for cleanup (bock 832). The function sends the data received from the secondary server in response to request of block 808 (block 834). The function ends process 800 thereafter.

Figure 9:
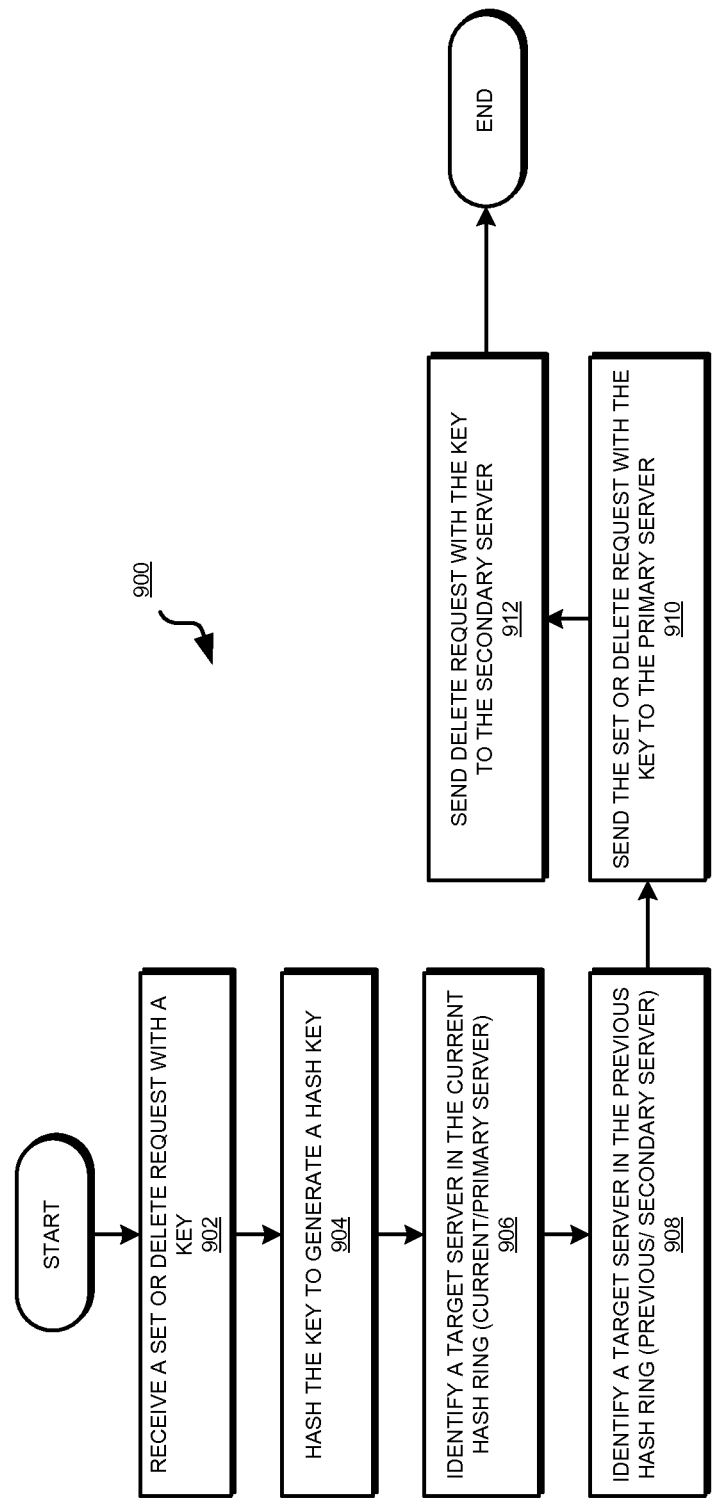
FIG. 9 depicts a flow chart of an example process for on-demand invalidation in in-memory caching with on-demand migration in accordance with an illustrative embodiment.

With reference to FIG. 9, this figure depicts a flow chart of an example process for on-demand invalidation in in-memory caching with on-demand migration in accordance with an illustrative embodiment. Process 900 can be implemented in application 115 in FIG. 1, such as in the form of one or more functions in library 504, 604, and 704 in FIGS. 5, 6, and 7, respectively. Hashing based operations are assumed and depicted in this figure only for the clarity of the description without implying any limitation thereto.

The function receives a set request or a delete request with a key (block 902). The function transforms, e.g. hashes, the key to generate a transformed identifier, e.g., a hash value or a hash key (block 904).

The function identifies a target server, to wit, a current server, in the current hash ring using the hash key (block 906). The function identifies a target server, to wit, a previous server, in a previous hash ring (block 906).

The function sends the set or delete request with the key to the primary server (block 908). The function sends a delete request with the key to the secondary server (block 910). The function ends process 800 thereafter.

Thus, a computer implemented method, system or apparatus, and computer program product are provided in the illustrative embodiments for in-memory caching with on-demand migration. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for on-demand migration of data in a distributed memory storage configuration, the method comprising:

transforming, at a client-side data processing system, using a processor, a first identifier to form a transformed identifier;

identifying, at the client-side data processing system, from a current configuration of a first plurality of servers operating on a server-side at a current time, a current server;

identifying, at the client-side data processing system, from a previous configuration of a second plurality of servers operating on a server-side at a previous time, a previous server;

sending, a first request to the current server to perform an operation using the first identifier;

sending, a second request to the previous server to perform the operation using the first identifier; and migrating, responsive to a first data in response to the first request being invalid and responsive to a second data in response to the second request being valid, the second data in a migration request from the client side data processing system to the current server.

2. The method of claim 1, further comprising:

saving, at the client-side data processing system, the current configuration of the first plurality of servers at the current time; and designating at the current time, an already saved configuration of the second plurality of servers operating on a server-side at the previous time, as the previous configuration.

3. The method of claim 1, further comprising:

receiving, at the client-side data processing system, a write request to perform a write operation on the server-side with a third data corresponding to a second identifier; sending a third request to the current server to perform the write operation; and sending a fourth request to the previous server to perform a delete operation corresponding to the second identifier.

4. The method of claim 3, further comprising:

sending a fifth request to a second previous server to perform a second delete operation corresponding to the second identifier.

5. The method of claim 1, further comprising:

receiving the first request from a requestor application executing on the client-side data processing system, wherein the first request includes the first identifier, wherein the first identifier corresponds to a data object stored on a server-side data processing system; and sending the second data to the requestor application in response to the first request.

6. The method of claim 1, further comprising:

invalidating the second data in the previous server by sending a delete request from the client side data processing system to the previous server.

7. The method of claim 1, further comprising:

receiving the first data in a first response from the current server; and receiving the second data in a second response from the previous server, wherein the previous server is not designated in the current configuration to process the operation.

8. The method of claim 1, wherein the first data being invalid comprises the first data being unavailable from the current server.

9. The method of claim 1, wherein each server in the first plurality of servers is a memcache server, and wherein the current configuration is a ring of memcache servers.

10. The method of claim 1, further comprising:

determining, as a part of the identifying the current server, that the current server is designated in the current configuration to process the operation; and determining, as a part of the identifying the previous server, that the previous server was designated in the previous configuration to process the operation.

11. The method of claim 1, wherein the transforming comprises hashing, and wherein the transformed identifier is a hash value of the first identifier according to a hashing algorithm.

12. The method of claim 1, further comprising:

determining that the current server was added to the previous configuration after the previous time.

13. A computer usable program product comprising a computer readable storage device including computer usable code for on-demand migration of data in a distributed memory storage configuration, the computer usable code comprising:

computer usable code for transforming, at a client-side data processing system, using a processor, a first identifier to form a transformed identifier;

computer usable code for identifying, at the client-side data processing system, from a current configuration of a first plurality of servers operating on a server-side at a current time, a current server;

computer usable code for identifying, at the client-side data processing system, from a previous configuration of a second plurality of servers operating on a server-side at a previous time, a previous server;

computer usable code for sending, a first request to the current server to perform an operation using the first identifier;

computer usable code for sending, a second request to the previous server to perform the operation using the first identifier; and computer usable code for migrating, responsive to a first data in response to the first request being invalid and responsive to a second data in response to the second request being valid, the second data in a migration request from the client side data processing system to the current server.

14. The computer usable program product of claim 13, further comprising:

computer usable code for saving, at the client-side data processing system, the current configuration of the first plurality of servers at the current time; and computer usable code for designating at the current time, an already saved configuration of the second plurality of servers operating on a server-side at the previous time, as the previous configuration.

15. The computer usable program product of claim 13, further comprising:

computer usable code for receiving, at the client-side data processing system, a write request to perform a write operation on the server-side with a third data corresponding to a second identifier; sending a third request to the current server to perform the write operation; and computer usable code for sending a fourth request to the previous server to perform a delete operation corresponding to the second identifier.

16. The computer usable program product of claim 15, further comprising:
  computer usable code for sending a fifth request to a second previous server to perform a second delete operation corresponding to the second identifier.

17. The computer usable program product of claim 13, further comprising:
  computer usable code for receiving the first request from a requestor application executing on the client-side data processing system, wherein the first request includes the first identifier, wherein the first identifier corresponds to a data object stored on a server-side data processing system; and
  computer usable code for sending the second data to the requestor application in response to the first request.

18. The computer usable program product of claim 13, wherein the computer usable code is stored in a computer readable storage device in a data processing system, and wherein the computer usable code is transferred over a network from a remote data processing system.

19. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

20. A data processing system for on-demand migration of data in a distributed memory storage configuration, the data processing system comprising:

a storage device, wherein the storage device stores computer usable program code; and
a processor, wherein the processor executes the computer usable program code, and wherein the computer usable program code comprises:
computer usable code for transforming, at a client-side data processing system, using a processor, a first identifier to form a transformed identifier;
computer usable code for identifying, at the client-side data processing system, from a current configuration of a first plurality of servers operating on a server-side at a current time, a current server;
computer usable code for identifying, at the client-side data processing system, from a previous configuration of a second plurality of servers operating on a server-side at a previous time, a previous server;
computer usable code for sending, a first request to the current server to perform an operation using the first identifier;
computer usable code for sending, a second request to the previous server to perform the operation using the first identifier; and
computer usable code for migrating, responsive to a first data in response to the first request being invalid and responsive to a second data in response to the second request being valid, the second data in a migration request from the client side data processing system to the current server.

* * * * *